Figure 1:
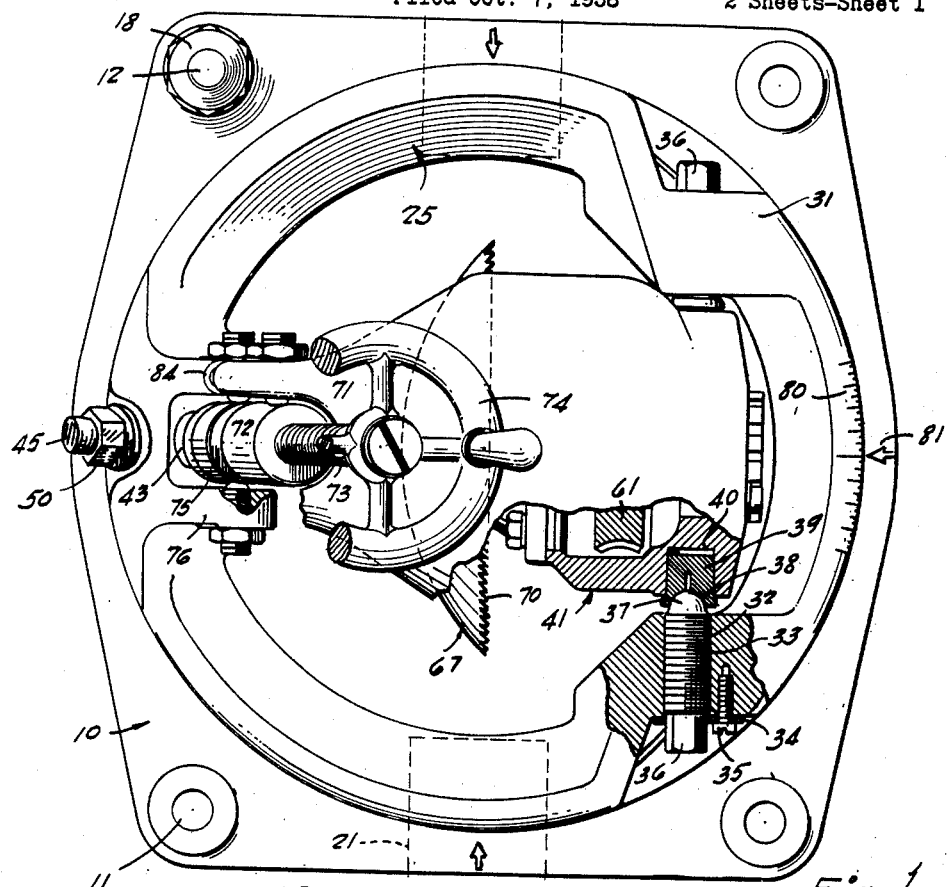

April 8, 1941.   E. B. MAILLART   2,237,570
METHOD OF PROBING A WELD
Filed Oct. 7, 1938   2 Sheets-Sheet 1

INVENTOR.
EDMOND B. MAILLART.
BY
ATTORNEY.

April 8, 1941. E. B. MAILLART 2,237,570
METHOD OF PROBING A WELD
Filed Oct. 7, 1938 2 Sheets-Sheet 2
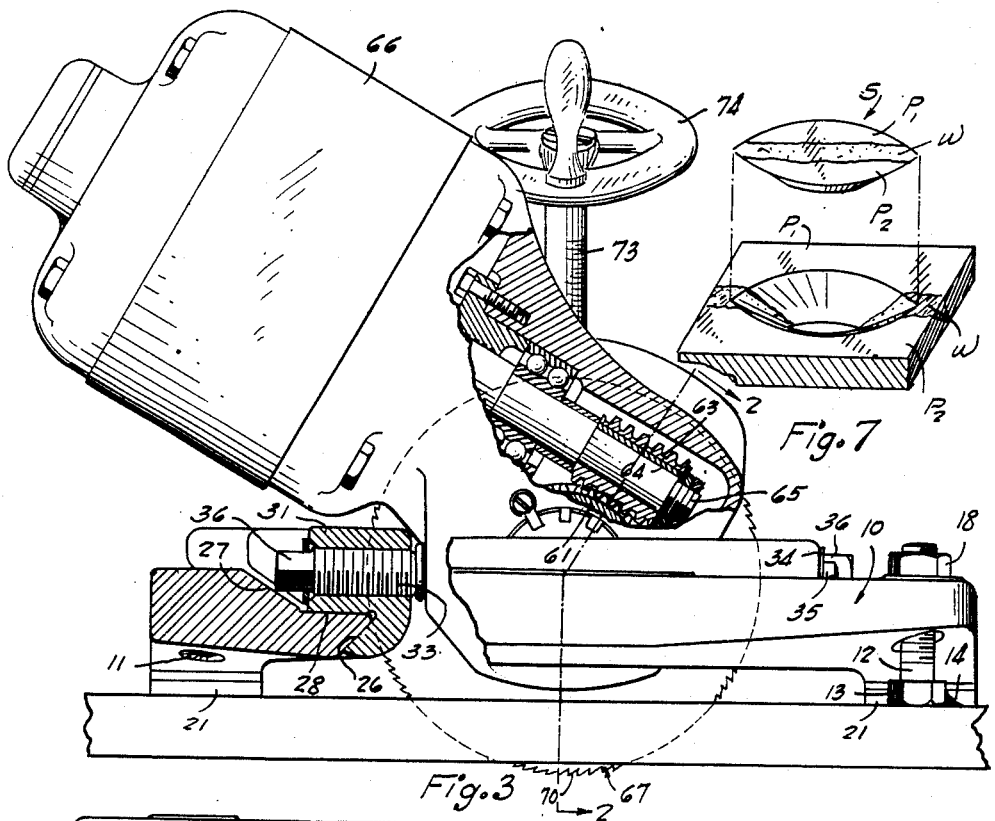
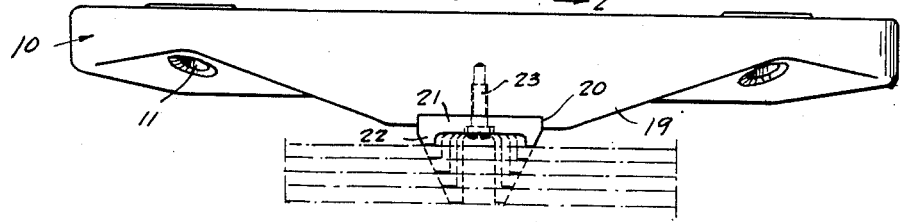
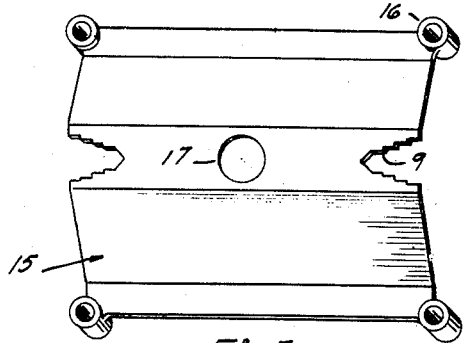
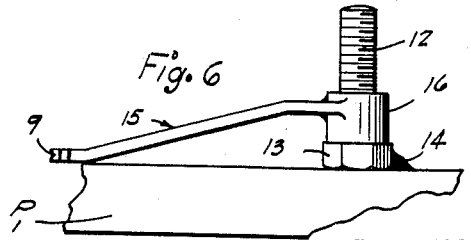
INVENTOR.
EDMOND B. MAILLART.
BY
ATTORNEY.

Patented Apr. 8, 1941

2,237,570

UNITED STATES PATENT OFFICE 2,237,570

METHOD OF PROBING A WELD

Edmond B. Maillart, Philadelphia, Pa., assignor to Frederick M. Bowers, Chester, Pa.

Application October 7, 1938, Serial No. 233,762

6 Claims. (Cl. 29—148)

This invention has to do with the probing of a weld and is concerned primarily with the provision of a novel method of probing welded joints as well as apparatus for carrying out this method.

In the various types of constructional work involving the joinder of metallic plates, such as steel plates, by welding it becomes necessary for inspection and testing purposes to probe the weld. Heretofore it has been the practice to cut out cylindrically shaped plugs or specimens at appropriate points along the welded joint, and these specimens have been examined and tested to ascertain if the welded joint is satisfactory and will meet the necessary requirements.

Obviously it becomes necessary to refill the openings from which the cylindrical specimens have been removed, and it has been the practice to tap the openings to form a thread and screw in a plug that is complementally threaded. In view of the difficulties and inconvenience which have been experienced in the refilling of these openings, the invention has in view, as its foremost objective, the provision of a novel method of probing a weld which is characterized by the cutting out of a specimen from the welded joint of such a shape that will leave a recess that is essentially non-cylindrical in character, and which may be readily filled by a welding material.

More in detail the invention contemplates a method involving the cutting out of a specimen to leave a recess in the welded joint that has a comparatively wide mouth at the top on one face of the plate, and a very small opening on the opposite face of the plate.

Still more in detail the invention has in view the provision of a method of probing a weld which includes the cutting out of a boat-shaped specimen, which operation leaves a boat-shaped recess defined by concave walls that connect the wider opening on one face with the narrower opening on the other.

In carrying out the above outlined method it becomes necessary to provide apparatus which may be operated to cut out the boat-shaped specimen. In accordance with this invention a saw blade in the form of a concavo-convex disk having the saw teeth formed on its peripheral edge is availed of as the cutting instrumentality.

An important object of the invention is the provision of means for operatively mounting this concave saw blade so that it may be fed to the steel plates in a required manner. It is well recognized in the metal working arts that the cutting of steel by sawing operations requires that the saw blade be nicely fed to the work, with the pressure on the blade accurately controlled. Otherwise there is grave danger of the blade being damaged.

Inasmuch as it is necessary to operate the saw blade to first cut one side of the boat-shaped specimen on one plate, then remove the saw blade from the work and reposition the same to cut the other side, accurate positioning of the cutting apparatus on the work is an important factor.

With this condition in mind another highly important object of the invention is the provision of apparatus of the character above described which includes means for rigidly securing the same to the plates on each side of the weld which is to be probed. This feature of the invention is of extreme importance when it is remembered that the plates having the welds which are to be probed assume various horizontal and vertical positions, and it is often necessary to probe an overhead weld.

Still another object of the invention is the provision of weld-probing apparatus of the character above described, which includes a concave saw blade of the type noted, together with power means for driving the same together with manual operable means for feeding the blade to the work.

Still another more detailed object in view is the provision of such apparatus which includes means for pivotally mounting the same on the plates having the butt-weld which is to be tested. With the saw blade power driving means and feeding mechanism so pivotally mounted, the blade may be readily swung from the position in which it cuts one side of the boat-shaped specimen over into the position in which the other side is cut.

This pivotal mounting of the blade and associated mechanism permits of the specimen being cut at any desired angle with respect to the welded joint.

Yet another object of the invention is the provision of weld-probing apparatus of the character above noted which includes a supporting framework that is anchored to the plates by tack welding.

More in detail the invention contemplates an arrangement wherein the required number of bolts have their heads tack welded to the plates at appropriate points, and these bolts extend through openings in the mounting framework, and nuts screwed thereon securely bolt the framework in position.

Another highly important object of the invention is the provision of weld-probing apparatus of the character above noted which may be readily adjusted to provide boat-shaped specimens of different sizes which would generally correspond to the thickness of the plates having the butt-welded joint.

Various other more detailed objects and advantages of the invention such as arise in connection with carrying out the above noted objectives in a practical embodiment will in part become apparent, and in part be hereinafter stated, as the description of the invention proceeds.

The invention, therefore, comprises a method of probing a weld which consists of first cutting out a boat-shaped specimen and subsequently refilling the recess by a welding material, together with apparatus for cutting out the boat-shaped specimen.

For a full and more complete understanding of the invention reference may be had to the following description and accompanying drawings, wherein—

Figure 2:
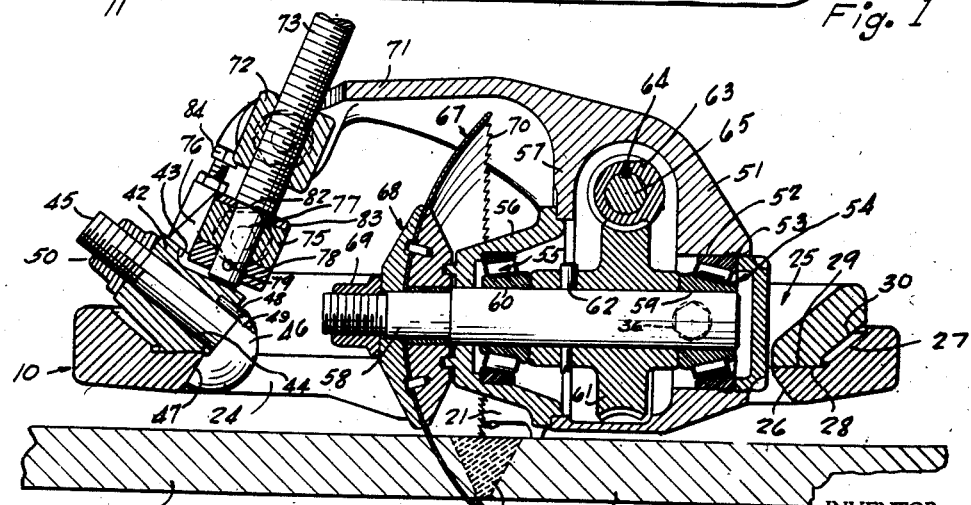

Figure 1 is a top plan view of weld-probing apparatus made in accordance with the precepts of this invention, Figure 2 is a side view taken as a section through the apparatus about on the plane represented by the line 2—2 of Figure 3, Figure 3 is a side view normal to the showing of Figure 2, with parts being shown in elevation and parts in section, Figure 4 is a side view of the supporting framework bringing out in dotted lines several removable pieces, any one of which is attached to the framework in accordance with the size of the specimen which is to be cut from the welded joint, Figure 5 is a detailed view in perspective of a template which is employed in tack welding the anchoring bolts to the plates, Figure 6 is a fragmentary view in side elevation showing the mode of usage of the template, and Figure 7 is a detailed perspective showing the specimen as removed from the plates in an exploded relationship.

Referring now to the drawings, wherein like reference characters denote corresponding parts, and more particularly to Figure 2, two steel plates are identified at P1 and P2 and are butt-welded together by a butt-welded joint referred to generally as W.

The apparatus of this invention hereinafter to be described is intended to cut a boat-shaped specimen from the joint W, such a specimen being shown in Figure 7 and identified by the reference character S. The apparatus for cutting out the specimen S comprises a mounting framework 10 of generally rectangular formation which is formed with bolt openings 11 at each corner. Threaded bolts 12 having heads 13 are tack welded to the plates P1 and P2, as shown at 14 in Figure 6.

To insure of accurate positioning of the bolts 12, a template, such as shown in Figure 5, may be employed. This template is designated 15, and the bolt openings 16 therein have relative positions that exactly correspond to the openings 11 in the mounting framework 10. Thus a bolt 12 is positioned in each of the openings 16 of the templates 15, whereupon the latter is positioned over the plates P1 and P2 with the spotting opening 17 directly overlying the weld W. The template 15 has each side edge formed with gauges in the form of a stepped recess 9 to adapt the template to joints of varying widths. The heads 13 of the bolts 12 are then tack welded to the plates P1 and P2, after which the template 15 is removed.

The supporting framework 10 is now positioned with the bolts 12 being received in the openings 11, whereupon nuts 18 are screwed on the threaded extremities of the bolts 12 to securely clamp the mounting framework 10 in position.

Referring more particularly to Figure 4, the framework 10 is shown as having downwardly depending central portions 19 that are disposed essentially centrally of the framework. These downwardly depending portions 19 are formed with central recesses 20 in which are received yokes 21 having legs 22 that are designed to straddle the weld W. These yokes 21 are detachably held in position in the recesses 20 by the screw bolt shown at 23, and in accordance with the broken line showing of Figure 4 may be replaced by other yokes 21 having legs 22 of varying length. The length of these legs 22 will depend upon the thickness of the plates which are to be cut and the size of the boat-shaped specimen which is to be taken therefrom. It suffices to say at this time that the extremities of the legs 22 engage the plates on each side of the weld W.

The mounting framework 10 is formed with a large circular opening 24 in which is mounted a swivel carriage identified at 25. In this connection it is notable that the cross sectional shape of the framework 10 about the opening 24 is illustrated in Figures 2 and 3, and is shown as including a lower truncated conical wall 26 and an upper truncated conical wall 27 of larger diameter that is connected to the lower conical wall 26 by the horizontal wall 28.

The swivel carriage 25 has a ring-like surface 29 corresponding to the wall 28 and in engagement therewith, and an outer conical wall 30 which might be said to be complemental to the truncated conical surface 27.

The swivel carriage 25 is formed with a pair of supporting arms 31 that are disposed in parallel relationship and which are formed with threaded openings designated 32.

The arms 31 include structural parts that extend beneath the mounting frame 10 and engage the surface 26, as shown in Figure 3.

Screwed into each of the openings 32 is a pivot pin 33 that is held in position by a lock washer 34 that is in turn anchored to the swivel carriage 25 by a set screw shown at 35. It will be noted that the lock washer 34 has non-circular opening that is complemental to and receives a non-circular head 36 on the pin 33.

The inner end of each of the pins 33 extends beyond the arms 31 and is of a formation constituting the same a trunnion, which is designated 37. The trunnions 37 are received in recesses 38 formed in bearing members 39. These bearing members 39 are positioned in sockets 40 formed in a framework of a swinging carriage designated 41.

Located substantially at the extremity of a diameter extending intermediate the arms 31 the swivel carriage 25 is formed with an enlarged portion 42 that is cut away at its upper surface to provide a recess 43 for a purpose to be hereinafter pointed out.

Extending through the enlarged portion 42 is an opening 44, and received in this opening is a bolt 45. The bolt 45 carries a so-called cap head 46, the latter having a surface at 47 that engages the truncated conical surface 26 on the mounting framework 10. The bolt 45 is held against rotation by a pin 48 that is received in a recess 49 formed in the carriage 25 (see Figure 2). The pin 48 engages the head 46 to prevent rotation of the bolt. A nut 50 is threaded on the extremity of the bolt 45.

It is evident that when the nut 50 is tightened (as it may be due to the bolt 45 being held against rotation) the surface 47 of the head 46 engages the surface 26 of the mounting framework 10, to clamp the swivel carriage 25 against swinging movement. However, when the swivel carriage 25 is to be swung around to another position this may be accomplished merely by loosening the nut 50.

It is evident that the engagement of the head 46 with the surface 26, as well as the similar engagement of the legs 31 therewith, serves to maintain the swivel carriage 25 assembled with the frame 10 regardless of which position the apparatus may assume in use.

It is evident that the carriage 41 is mounted for swinging movement on a horizontal axis as defined by the trunnions 37. This carriage 41 includes an end structure designated 51 formed with an opening 52 that is threaded at its outer end, as shown at 53, and which opening carries a bearing assembly referred to in its entirety at 54. A second bearing assembly 55 is disposed more centrally of the carriage 41 and in alignment with the bearing assembly 54. This second bearing assembly 55 is carried by a cage 56 that is in turn carried by a wall 57 of the carriage 41.

A shaft 58 extends through the bearing assemblies 54 and 55, being anchored to the inner members, designated 59 and 60, and intermediate these members 59 and 60 carries a worm gear 61 that is keyed thereto, as shown at 62. Meshing with the worm gear 61 is a worm 63 that is keyed, as shown at 64, to a shaft 65 that constitutes the drive shaft of an electric motor referred to in its entirety by the reference character 66.

It will be noted that this worm 63 is disposed in the recess that is defined by the wall 57 and the end structure 51 of the swinging carriage 41. The structure of this carriage is continued to provide a suitable housing and support for this motor 66.

The shaft 58 extends beyond the cage 56 and a concavo-convex saw blade 67 is drivably mounted thereon by the structural arrangement shown in Figure 2 and referred to in its entirety by the reference character 68. This saw 67 is defined by a portion of a hollow sphere, the center of which is located on the axis defined by the trunnions 37. A nut at 69 securely holds the blade 67 and associated supporting structure in position on the shaft 58.

It is notable that the saw blade 67 has its peripheral edge formed with saw teeth 70, and in the initial position of the saw these teeth engage one of the plates $P_1$ or $P_2$ intermediate of the yokes 21.

The swinging carriage 41 is formed with a forwardly extending cap-like structure designated 71, which carries a hinged nut 72 that is pivotally mounted thereon. A feed screw 73 is threaded through the nut 72, and at its upper end carries an operating member in the form of a hand wheel 74.

A bearing member 75 is pivotally mounted on brackets 76 that upstand from the swivel carriage 25. The lower end portion of the screw stem 73 is reduced and free from threads, as shown at 77, and this portion extends through the bearing member 75. At the lower extremity a thrust collar 78 is pinned to the end portion 77 of the screw stem 73, as shown at 79. The reduced portion 77 provides a shoulder 82 that is engaged by a thrust washer 83. A stop bolt shown at 84 serves to limit movement of the swinging carriage 41 with respect to the swivel carriage 25. Thus, assurance is had that the saw 67 will not overrun the cut which is to be made.

The mode of operation of the above described apparatus may be briefly outlined as follows:

Two yokes 21 having legs 22 of proper length corresponding to the thickness of the plates $P_1$ and $P_2$ or the size of the specimen to be removed, are positioned in the recesses 20 of the mounting frame 10 prior to application of the mounting frame 10 to the bolts 11. After the mounting frame 10 has been securely clamped in position by the nuts 18, the hand wheel 74 is operated to turn the feed screw 73 to move the swinging carriage 41 about the pivotal axis defined by the trunnions 37 so that the saw teeth 70 are positined slightly above the surface of the respective plate $P_1$ or $P_2$. The motor M is now started in operation and the power therefrom transmitted through drive shaft 65, worm 63, worm gear 61 and shaft 58 to drive the saw 67 under power.

As the saw blade 67 rotates rapidly, the hand wheel 74 is manually operated to turn the feed screw 73. As this screw stem 73 is rotated the cap-like structure 71 is moved downwardly due to the engagement of the thrust collar 78 with the bearing member 75 that is secured to the swivel carriage 25. Thus, a required amount of pressure is applied to the saw blade 67 to form the cut.

After one of the plates, say for instance the plate $P_1$, has been cut through a required distance, the saw blade 67 is removed from the cut by rotating the feed screw 73 in a reverse direction. During the operations just described the swivel carriage 25 will have been securely held in position, because the nut 50 will have been tightened, causing the surface 47 of the head 46 to engage the surface 26 of the mounting frame 10. Moreover this swivel carriage will have been rotated to accurately positon the saw blade 67, the calibrations at 80 on the swivel carriage 25 cooperating with one of the pointers 81 on the mounting frame 10.

After the saw blade 67 is raised out of the cut which has been formed in the plate $P_1$, the nut 50 is loosened and the swivel carriage swung around substantially 180° so that the saw blade 67 is positioned to form the cut in the plate $P_2$, which completes the cutting out of the boat-like specimen. Again accurate positioning of the saw blade may be had due to the calibrations 80 and pointer 81 on carriage 25 and frame 10 respectively.

After the boat-like specimen has been cut out the probing apparatus may be removed by taking off the nuts 18 and lifting the framework 10 from the bolts 12. The latter may now be knocked off (as the tack welds 14 may be easily fractured) and the recess left by the removal of the specimen S may be readily filled by using an appropriate welding material.

It is evident that the apparatus above described is of a compact nature, and it is necessary to mount the same on the plates but once, and which mounting suffices for forming both the cuts necessary to taking out the boat-shaped specimen. Moreover, means are provided for insuring that the saw blade is accurately positioned for the formation of the cuts. Furthermore the mechanism for feeding the saw blade to the work insures against injury to the blade.

Moreover the means provided for feeding the saw blade to the work is of a positive nature not dependent on gravity action. Thus, the apparatus is readily adaptable for use in any horizontal, vertical or overhead positions.

While the apparatus above described is designed primarily for cutting out specimens intended to be used for testing and examination purposes, the apparatus is equally susceptible of use in cutting out defective portions of welded joints.

While a preferred specific embodiment of the invention is hereinbefore set forth it is to be clearly understood that the invention is not to be limited to the exact construction illustrated and described, because various modifications of these details may be provided in putting the invention into practice within the purview of the appended claims.

I claim:

1. The method of removing a solid boat-shaped specimen from a weld which comprises anchoring guiding means to plates joined by a welded joint, and then cutting out the solid boat-shaped specimen from said welded joint at the same time guiding the cutting operations from said guiding means.

2. The method of probing a weld which consists in cutting out a specimen from a welded joint by continuously cutting a uniform spheroidal surface, continuously cutting a second spheroidal surface in such relation to the first said spheroidal surface that the two spheroidal surfaces define the specimen, removing said specimen to leave a recess defined by said spheroidal surfaces, and filling said recess with a welding filler by carrying out welding operations to complete the welded joint at the recess.

3. The method of removing a test specimen from a metallic element and reconditioning said element which comprises cutting said element on a curved surface, then cutting said element on a second curved surface that intersects said first curved surface at two opposite ends of said first-mentioned surface, removing the specimen formed by said cuts to leave a correspondingly shaped recess, and refilling said recess by welding operations.

4. The method of removing a solid test specimen from a metallic element and reconditioning said element which comprises cutting said element on a curved surface, then cutting said element on a second curved surface that intersects said first curved surface at two opposite ends of said first-mentioned surface with the lines of intersections spaced a greater distance apart than the maximum distance between said curved surfaces, removing the specimen formed by said cuts to leave a correspondingly shaped recess, and refilling said recess by welding operations.

5. The method of removing a solid test specimen from a metallic element and reconditioning said element which comprises cutting said element on a curved surface determined by a center remote from the specimen to be removed, then cutting said element on a second curved surface that intersects said first curved surface at opposite ends, said second curved surface being determined by a center remote from said specimen and the center of said first curved surface, removing the specimen formed by said cuts to leave a correspondingly shaped recess, and refilling said recess by welding operations.

6. The method of removing a test specimen from a metallic element which comprises tack welding anchorage means to said metallic element at points remote from the specimen desired to be removed, and guiding and carrying out a plurality of cutting operations that are guided by said anchorage means to remove a specimen from said element.

EDMOND B. MAILLART.